(12) United States Patent
Iyer et al.

(10) Patent No.: US 9,562,159 B2
(45) Date of Patent: Feb. 7, 2017

(54) UV-ACTIVE CHROMOPHORE FUNCTIONALIZED POLYSILOXANES AND COPOLYMERS MADE THEREFROM

(71) Applicant: Momentive Performance Materials Inc., Waterford, NY (US)

(72) Inventors: Narayana Padmanabha Iyer, Bangalore (IN); Indumathi Ramakrishnan, Bangalore (IN); Roy Rojas-Wahl, Teaneck, NJ (US); Samim Alam, Tarrytown, NY (US)

(73) Assignee: Momentive Performance Material Inc., Waterford, NY (US)

( * ) Notice: Subject to any disclaimer, the term of this patent is extended or adjusted under 35 U.S.C. 154(b) by 0 days.

(21) Appl. No.: 14/790,464

(22) Filed: Jul. 2, 2015

(65) Prior Publication Data
US 2016/0002412 A1 Jan. 7, 2016

Related U.S. Application Data

(60) Provisional application No. 62/020,554, filed on Jul. 3, 2014.

(51) Int. Cl.
| | | |
|---|---|---|
| C08L 83/10 | (2006.01) |
| C08G 77/14 | (2006.01) |
| C08G 77/448 | (2006.01) |
| C08G 77/12 | (2006.01) |
| C08G 77/00 | (2006.01) |

(52) U.S. Cl.
CPC ............... C08L 83/10 (2013.01); C08G 77/14 (2013.01); C08G 77/12 (2013.01); C08G 77/448 (2013.01); C08G 77/80 (2013.01); C08G 2261/594 (2013.01)

(58) Field of Classification Search
None
See application file for complete search history.

(56) References Cited

U.S. PATENT DOCUMENTS

| | | | |
|---|---|---|---|
| 3,189,662 A | 6/1965 | Vaughn, Jr. | |
| 3,419,634 A | 12/1968 | Vaughn, Jr. | |
| 3,679,774 A | 7/1972 | Le Grand | |
| 3,821,325 A | 6/1974 | Merritt, Jr. et al. | |
| 3,832,419 A | 8/1974 | Merritt, Jr. | |
| 4,172,103 A | 10/1979 | Serini et al. | |
| 5,616,674 A * | 4/1997 | Michel | C08G 63/79 524/537 |
| 6,375,940 B1 * | 4/2002 | Richard | A61K 8/898 424/401 |

(Continued)

FOREIGN PATENT DOCUMENTS

| | | |
|---|---|---|
| FR | 2754446 A1 | 4/1998 |
| GB | 2078242 A | 1/1982 |
| WO | 2008000084 A1 | 3/2008 |

OTHER PUBLICATIONS

International Search Report and Written Opinion for PCT/US2015/038955, dated Sep. 28, 2015, 13 pages.

*Primary Examiner* — Marc Zimmer
(74) *Attorney, Agent, or Firm* — Hoffman Warnick LLC

(57) ABSTRACT

Disclosed herein is a polyorganosiloxane having the structure of Formula I:

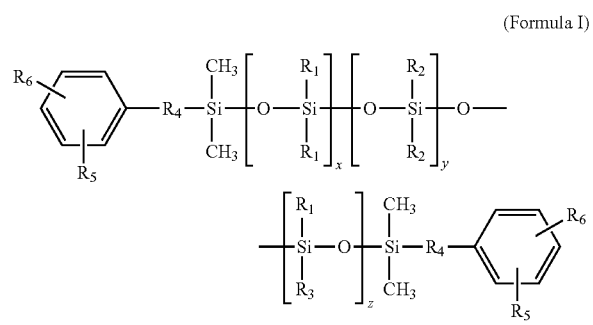

(Formula I)

wherein, $R_1$ and $R_2$ are independently a hydrocarbon radical, an unsaturated radical, an alkoxy radical, an aryl radical or an alkenyloxy radical. $R_3$ is an organic UV absorbing group, $R_4$ independently is a direct bond, hydrocarbon radical optionally substituted with oxygen and nitrogen, or a group of Formula II(a) or Formula II(b)

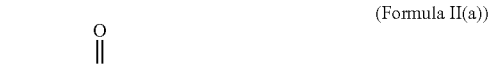

(Formula II(a))

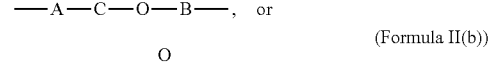

(Formula II(b))

wherein A and B are a hydrocarbon radical, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300, y is from 0 to 50 and z is from 1 to 50. The polyorganosiloxane is used to make various copolymers or polymer blends. A variety of articles can be made using the polysiloxane described as a polymer blend or copolymer.

20 Claims, No Drawings

(56) References Cited

U.S. PATENT DOCUMENTS

| | | | |
|---|---|---|---|
| 2008/0081884 A1 | 4/2008 | Glasgow et al. | |
| 2010/0047709 A1* | 2/2010 | Echigo | C07C 37/20 |
| | | | 430/270.1 |
| 2011/0110873 A1* | 5/2011 | Horstman | A61K 8/0229 |
| | | | 424/59 |
| 2013/0018132 A1 | 1/2013 | Hiwatari et al. | |
| 2014/0051804 A1* | 2/2014 | Zhou | C08G 77/48 |
| | | | 524/769 |
| 2015/0141586 A1* | 5/2015 | Kanuma | C08G 77/448 |
| | | | 525/464 |

* cited by examiner

UV-ACTIVE CHROMOPHORE FUNCTIONALIZED POLYSILOXANES AND COPOLYMERS MADE THEREFROM

FIELD OF THE INVENTION

The invention is directed to UV active chromophores functionalized polysiloxanes and copolymers made therefrom.

BACKGROUND OF THE INVENTION

In general, synthetic resins have various functions depending on their use and the conditions to which the resins are subjected. Conventional synthetic resins are modified by adding functional monomers or polymers to the synthetic resins to impart novel functions. Thermoplastic resins are generally characterized by many advantageous properties which include optical clarity, high ductility, high heat deflection temperature and as dimensional stability. As a result of such properties they are often employed in many industrial applications. Aromatic polycarbonates are described in U.S. Pat. No. 4,172,103. Aromatic polycarbonates are prepared by reacting a dihydric phenol (example—2,2-bis(4-hydroxyphenyl) propane) with a carbonate precursor such as phosgene, in the presence of an acid binding agent. In general, aromatic polycarbonates exhibit good resistance to attack by mineral acids, are readily moldable, and are physiologically inert.

Polydioranosiloxane/polycarbonate block copolymers are described in U.S. Pat. Nos. 3,189,662, 3,821,325, 3,832,419 and 3,679,774. Polydioranosiloxane/polycarbonate block copolymers are used as coatings, insulating materials, coverings, binding materials and adhesives.

U.S. Pat. No. 3,419,634 discloses polydiorganosiloxane/polycarbonate block copolymers with unsaturated end groups, which can be cured and which can contain fillers. These block copolymers can be used inter alia as coverings, car windows, binders for safety glass and seals for glass.

While thermoplastic resins possess many advantageous properties, they are susceptible to photodegradation by ultraviolet light. The photodegradation results in unfavorable characteristics including yellowing and erosion of the polymer surface. There are different ways to prepare thermoplastic resins, such as polycarbonate with improved UV resistance properties. One of the methods employs treating a polycarbonate surface with a coating material, containing ultraviolet absorbing agents. This approach suffers from poor compatibility of the UV absorbing agents with the coating materials which limits the amount of UV absorbing agent that can be employed in coating. Extra steps involved in coating polycarbonates increase the cost of manufacturability. Another method involves the addition of UV absorbing materials as an additive during the polycarbonate processing step. Even though such a process avoids the additional coating step, UV stabilizers can be added only in very small quantities (in ppm levels) without affecting the optical clarity of polycarbonate article. Thermal degradation of UV stabilizers is also a limitation at very high processing temperature of polycarbonate (275° C. to 300° C.).

WO2008/00084 A1 discloses that UV absorbers that can be used in mixtures of high-molecular aromatic polycarbonate with up to 50 percent by weight of a block copolymer consisting of alternating segments of aromatic polycarbonate and polysiloxane in a weight ratio of 25:75 to 75:25. The mixtures are distinguished by a high ductility, solvent resistance and improved fire behavior.

However, the known additive approach in the prior art for improving the UV resistance of polycarbonate and/or polycarbonate-polysiloxane copolymers or polymer blends has the disadvantage of additive leachability and additional processing steps. Accordingly, there is a need for polysiloxane compositions that can provide improved UV resistance with a reduced number of processing steps. The present invention provides answer to that need.

SUMMARY

Disclosed herein is a polysiloxane having the structure of Formula I:

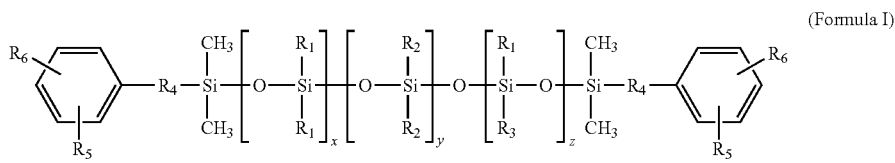
(Formula I)

wherein $R_1$ and $R_2$ are independently a hydrocarbon radical, an unsaturated radical, an alkoxy radical, an aryl radical or an alkenyloxy radical, $R_3$ is an organic UV absorbing group, $R_4$ is independently a direct bond or hydrocarbon radical optionally substituted with oxygen and nitrogen, or a group of Formula II(a) or Formula II(b)

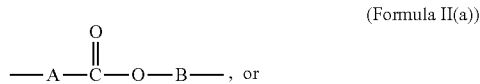
(Formula II(a))

(Formula II(b))

wherein A, B are a hydrocarbon radical, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300, y is from 0 to 50 and z is from 1 to 50.

There is provided a copolymer composition having the units of the Formula VI:

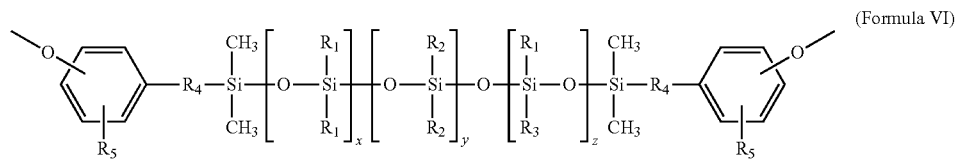

wherein $R_1$ and $R_2$ are independently a hydrocarbon radical, an unsaturated radical, an alkoxy radical, an aryl radical or an alkenyloxy radical, $R_3$ is an organic UV absorbing group, $R_4$ is independently a direct bond or hydrocarbon radical optionally substituted with oxygen and nitrogen, or a group of Formula II(a) or Formula II(b)

(Formula II(a))

—A—C(=O)—O—B—, or (Formula II(b))

—A—O—C(=O)—B— wherein, A, B are a hydrocarbon radical. $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300, y is from 0 to 50 and z is from 1 to 50.

Disclosed herein is a method of preparing a polysiloxane copolymer. The method includes polymerizing an organosiloxane represented by Formula I:

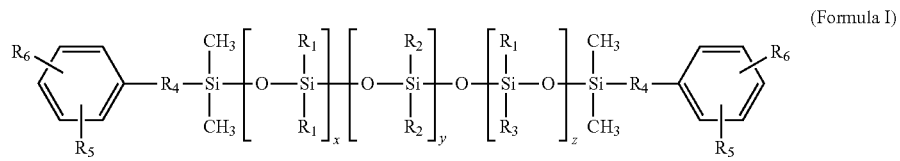

wherein $R_1$ and $R_2$ are independently a hydrocarbon radical, an unsaturated radical, an alkoxy radical, an aryl radical or an alkenyloxy radical. $R_3$ is an organic UV absorbing group. $R_4$ is independently a direct or bond, hydrocarbon radical optionally substituted with oxygen and nitrogen, or a group of Formula II(a) or Formula II(b)

(Formula II(a))

—A—C(=O)—O—B—, or (Formula II(b))

—A—O—C(=O)—B— wherein A and B are a hydrocarbon radical, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300, y is from 0 to 50 and z is from 1 to 50, with a compound represented by Formula VIII:

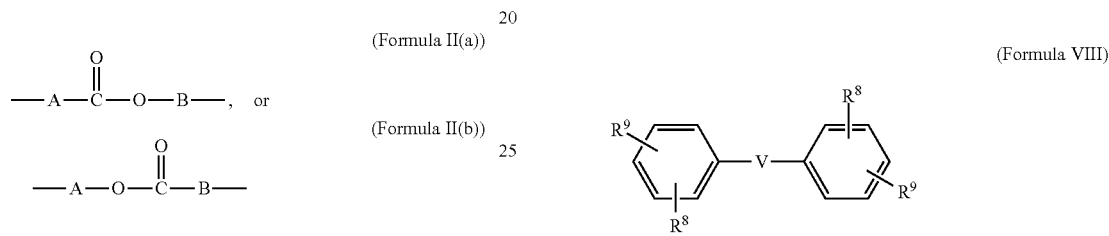

wherein $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, and $R_9$ is independently a hydroxyl group, an amine group, an acid chloride group, or a sulfonyl halide group, and V is selected from the group consisting of:

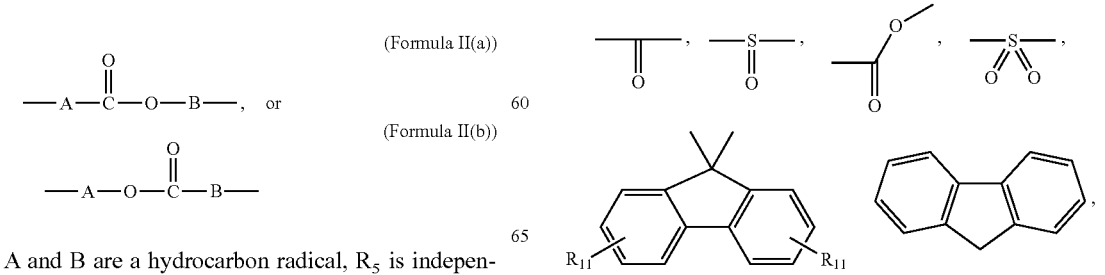

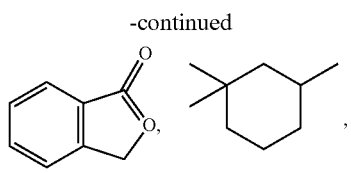

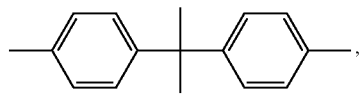

-continued

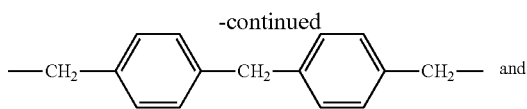

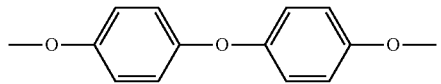

wherein $R_{10}$ and $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group. The polymerization is carried out in the presence of a carbonate precursor, to provide the polycarbonate-polysiloxane copolymer.

DETAILED DESCRIPTION

Disclosed herein is as UV-resistant polysiloxane. The UV-resistant polysiloxane is suitable for use as a polymeric block in block copolymers such as polycarbonate. The UV absorbing moiety is covalently attached with the reactive polysiloxane. Compared with the known application processes, such as, swelling of a polymeric surface with a highly concentrated solution of a UV absorber, coating a polymeric surface with a special protective lacquer containing UV absorber or co-extruding a covering layer rich in UV absorber, the incorporation of the UV absorbing moiety covalently with the reactive polysiloxane has the advantage of being more UV-resistant and easier to process, thereby reducing cost.

The polysiloxane/polycarbonate blocks copolymers disclosed herein show inherent UV resistant characteristics wherein the UV absorbing moiety is attached covalently with the polysiloxane. Such copolymers do not require an additional processing step, there is no risk of damage to the thin-walled moldings due to a solvent effect or after-baking, and there are no calibration problems (such as those encountered with co-extrusion).

The resulting mixtures of inherent UV absorbing polysiloxane/polycarbonate block copolymers can be extruded by any known manner to give the panels, films, casts with better inherent UV resisting characteristics.

The disclosure herein is directed to a polysiloxane having the structure of Formula I:

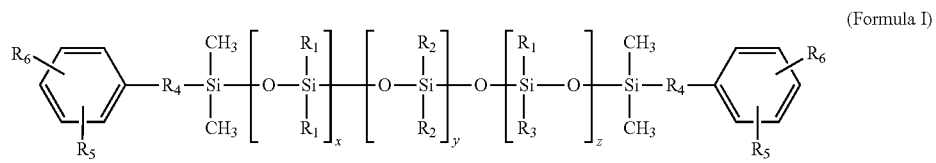

(Formula I)

wherein $R_1$ and $R_2$ are independently a hydrocarbon radical, an unsaturated radical, an alkoxy radical, an aryl radical or an alkenyloxy radical; $R_3$ is an organic UV absorbing group; $R_4$ is independently a direct bond or hydrocarbon radical optionally substituted with oxygen and nitrogen, or a group of Formula II(a) or Formula II(b)

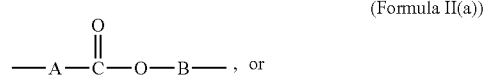

(Formula II(a))

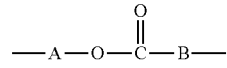

(Formula II(b))

wherein A and B are a hydrocarbon radical; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; $R_6$ is independently a hydroxyl group, an amine group, an acid chloride group, or a sulfonyl halide group; x is from 1 to 250; y is from 0 to 40 and z is from 1 to 40.

There is described a method of preparing a polysiloxane compound of the structure shown above. The method includes obtaining a hydride terminated siloxane from cyclic oligomers, e.g. a cyclic siloxane. The hydride terminated siloxanes can be obtained through ring opening polymerization of a cyclic siloxane with disiloxane hydride in presence of acidic and/or basic catalyst. The hydride terminated siloxane represented by Formula III:

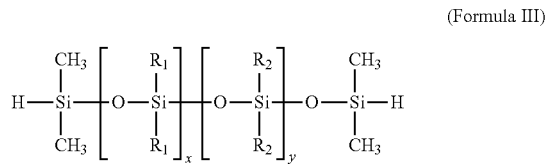

(Formula III)

wherein $R_1$ and $R_2$ are independently a hydrocarbon radical, an unsaturated radical, an alkoxy radical, an aryl radical or an alkenyloxy radical; wherein x is from 1 to 300 and y is from 0 to 50. The hydride terminated siloxane is hydrosilylated with an unsaturated containing substituted/unsubstituted hydroxyphenyl compound to obtain a hydroxyphenyl compound terminated siloxane and then equilibrated. Equilibration of the hydroxyphenyl compound terminated siloxane is through combination of a hydride substituted cyclic siloxane. The obtained hydride substituted hydroxyphenyl compound terminated polysiloxane is represented by Formula I:

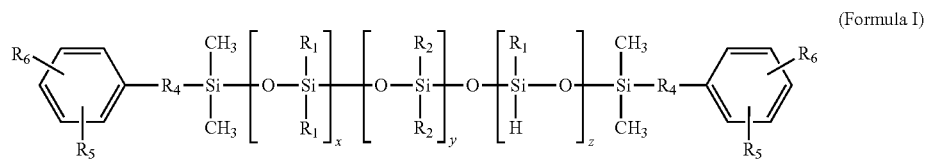
(Formula I)

wherein $R_1$ and $R_2$ are independently a hydrocarbon radical, an unsaturated radical, an alkoxy radical, an aryl radical or an alkenyloxy radical; $R_4$ is independently a direct bond or hydrocarbon radical optionally substituted with oxygen and nitrogen, or a group of Formula II(a) or Formula II(b)

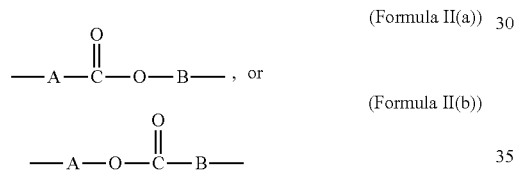

wherein A and B are a hydrocarbon radical; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; $R_6$ is independently a hydroxyl group, an amine group, an acid chloride group, or a sulfonyl halide group; wherein x is from 1 to 300; y is from 0 to 50; and z is from 0 to 50, is reacted with an unsaturated functional UV absorbing agent in the presence of a catalyst such as platinum, at a temperature of preferably 50° C. to 80° C. to yield the UV absorbing polysiloxane. The UV absorbing polysiloxane is purified of organics in under reduced pressure at a temperature of about 150 to 300° C. to obtain pure UV containing polysiloxane compound. The UV absorbing agents and catalysts are described in more detail below.

In embodiments, the UV absorbing group $R_3$ is selected from the group consisting of 2-hydroxy-4-methoxybenzophenone, 2-hydroxy-4-methoxy-2'-carboxybenzophenone, 2,4-dihydroxybenzophenone, 2,2'-dihydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-methylphenyl)-2H-benzotriazole, 2-(2'-hydroxy-5'-tert.-butylphenyl)-2H-benzotriazole, 2-(2'-hydroxy-3'-methyl-5'-tert.-butyl-phenyl)-2H-benzotriazole, 2-(2'-hydroxy-5'-cyclohexyl-phenyl)-2H-benzotriazole, 2'-(2'-hydroxy-3',5'-dimethyl-phenyl)-2H-benzotriazole, 2-(2'-hydroxy-5'-isooctylphenyl)-2H-benzotriazole, 2-(2'-hydroxy-3'-tert.-butyl-5'-sec.-butylphenyl)-2H-benzotriazole and 2-(2'-hydroxy-3',5'-dimethyl-phenyl)-2H-benzotriazole; preferably benzophenones, and dibenzoylresorcinal.

In embodiments, the benzophenone has the structure of Formula IV:

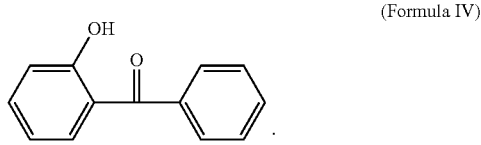
(Formula IV)

In embodiments, the dibenzoylresorcinol has the structure of Formula V:

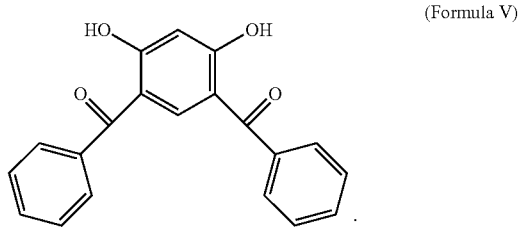 [SMILES: O=C(c1ccccc1)c1cc(C(=O)c2ccccc2)c(O)cc1O]
(Formula V)

In embodiments, the disclosure is also directed to a copolymer composition including a copolymer of formula referred to as Formula VI:

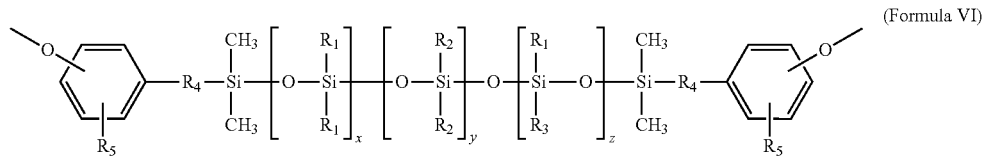
(Formula VI)

wherein; $R_1$ and $R_2$ are independently, a hydrocarbon radical, an unsaturated radical, an alkoxy radical, an aryl radical or an alkenyloxy radical; $R_3$ is an organic UV absorbing group selected from group consisting of 2-hydroxy-4-methoxybenzophenone, 2-hydroxy-4-methoxy-2'-carboxybenzophenone, 2,4-dihydroxybenzophenone, 2,2'-dihydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-methylphenyl)-2H-benzotriazole, 2-(2'-hydroxy-5'-tert.-butylphenyl)-2H-benzotriazole, 2-(2'-hydroxy-3'-methyl-5'-tert.-butyl-phenyl)-2H-benzotriazole, 2-(2'-hydroxy-5'-cyclohexyl-phenyl)-2H-benzotriazole, 2'-(2'-hydroxy-3',5'-dimethyl-phenyl)-2H-benzotriazole, 2-(2'-hydroxy-5'-isooctylphenyl)-2H-benzotriazole, 2-(2'-hydroxy-3'-tert.-butyl-5'-sec.-butylphenyl)-2H-benzotriazole and 2-(2'-hydroxy-3',5'-dimethyl-phenyl)-2H-benzotriazole; more preferably benzophenones, and dibenzoylresorcinal; $R_4$ is independently a direct bond or hydrocarbon radical optionally substituted with oxygen and nitrogen, or a group of Formula II(a) or Formula II(b)

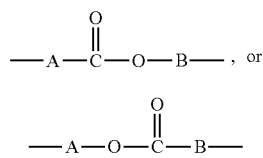

(Formula II(a))

(Formula II(b))

wherein A and B are hydrocarbon a radical; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; $R_6$ is independently a hydroxyl group, an amine group, an acid chloride group, or a sulfonyl halide group; x is from 1 to 300; y is from 0 to 50 and z is from 1 to 50.

In embodiments, the copolymer composition further includes the structural units of Formula VII

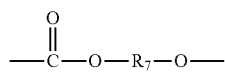

(Formula VII)

wherein each $R_7$ is independently a hydrocarbon radical having 1 to 60 carbon atoms, a divalent hydrocarbon group, a group derived from the structural unit of Formula VII;

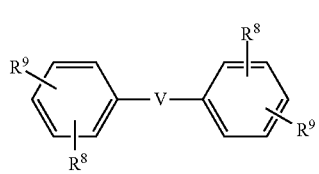

(Formula VIII)

wherein $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and V is selected from the group consisting of:

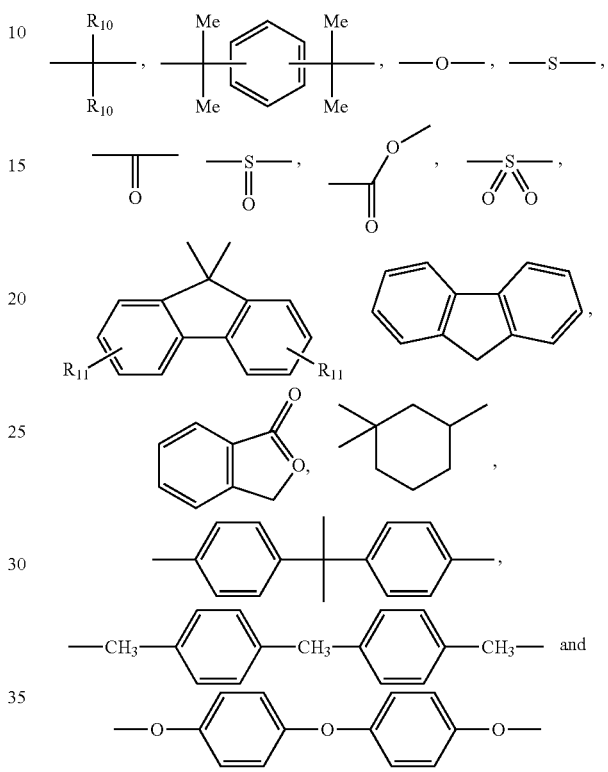

wherein; $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group, wherein, in the presence of a carbonate precursor produces polycarbonate-polysiloxane copolymer.

In embodiments, Formula I can be combined with a polycarbonate homopolymer, a polycarbonate copolymer, a polycarbonate-polyester, a polyester, polysulfones, polyethersulfones, polyetheretherketones, polyimides and polyetherimides or combinations thereof.

In embodiments, the disclosure is also directed to a polymer blend composition including the polysiloxane of Formula I or a copolymer including the units of Formula VII and Formula VIII below:

(Formula VII)

wherein each $R_7$ is a hydrocarbon radical having 1 to 60 carbon atoms, a divalent hydrocarbon group, or a group derived from the structural unit;

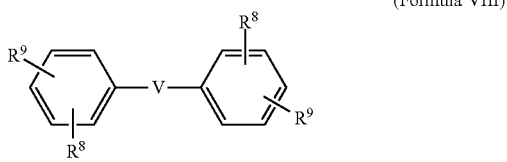

(Formula VIII)

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and V is selected from the group consisting of:

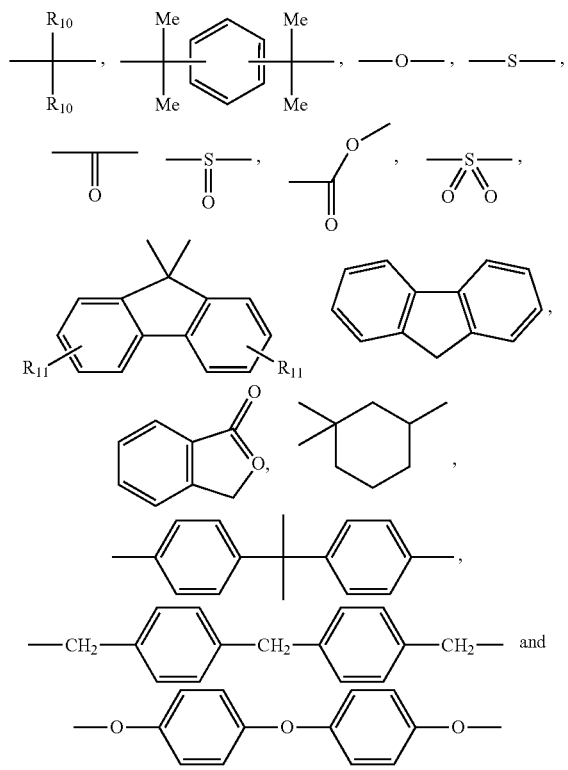

wherein; $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

In embodiments of the polycarbonate copolymer blend disclosed above, $R_9$ is independently a hydroxy group and $R_{10}$ is independently an alkyl group of from 1 to 6 carbon atoms.

The copolymer of the present invention may be prepared by polymerizing a dihydroxy benzene compound with a bis-functionalized polyorganosiloxane compound in the presence of a carbonate precursor, such as phosgene. In one embodiment, the dihydroxy benzene compound is bisphenol A, and the bis-functionalized polydiorganosiloxane compound of Formula I.

In embodiments of the method of polymerizing the copolymer disclosed herein, the carbonate precursor is selected from the group consisting of phosgene, diphosgene, triphosphene and diarylcarbonates, bis(methylsalicyl)carbonate, or combinations thereof.

In embodiments, the polymerization reaction is an interfacial polymerization process conducted in the presence of a solvent that includes chlorinated aliphatic organic liquid, methylene chloride, chloroform, carbon tetrachloride, 1,2-dichloroethane, trichloroethane, tetrachloroethane, dichloropropane, 1,2-dichloroethylene, chlorobenzene, dichlorobenzene, chlorine-containing aromatic solvents, toluene, various chlorotoluenes and the like, aqueous solvents such as de-ionized water, a caustic, and optionally one or more catalysts.

Suitable catalysts for the interfacial polymerization reaction includes aliphatic amines such as tertiary amine catalysts, trialkylamine; phase transfer catalyst such as catalysts of the formula $(A_3)4L+B$, wherein each A is independently a C1-10 alkyl group; L is a nitrogen or phosphorus atom; and B is a halogen atom or a C1-8 alkoxy group or C6-18 aryloxy group. Combinations of such catalysts are also effective.

In embodiments, the polymerization reaction is performed by reacting bisphenol A with phosgene in a biphasic solvent in the presence of a phase transfer catalyst to form a bischloroformate; and adding dihydroxy silicone to form the copolymer. In embodiments, chloroformates of dihydroxy silicone are formed in a tube reactor, and then added into an interfacial polycondensation reactor with a catalyst.

A variety of articles of manufacture can be made using the copolymers of the invention, and particularly using polymer blend compositions containing the copolymers of the invention (for example, in combination with a polycarbonate homopolymer). The resulting block copolymers including the UV absorbing polydiorganosiloxane polymers can be extruded by a known manner to give panels, films, casts with better inherent UV resisting characteristics.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Synthesis of Hydride Terminated Siloxane Fluid $^HMD_{45}M^H$

A mixture of octamethylcyclotetrasiloxane (D4) (500 g), and Purolite CT275 (2.298 g) were placed in a 500 ml RB flask equipped with a magnetic stirrer, a reflux condenser and stirred under nitrogen. To the stirred mixture, 1,1,3,3-tetramethyldisiloxane (HMMH)(19.68 g) was added at room temperature. The flask heated and held at about 50° C. for about one hour and then the temperature was increased to about 60° C. for about one hour. The temperature was then increased to 70° C. for about 2 hours and then increased to about 80° C. for about 4 hours. After completion of the reaction, the flask was cooled to less than 30° C., treated with Celite (0.750 g) and filtered. Volatiles were removed by applying a vacuum at 130° C./5 mbar to yield 480 g of clear colorless liquid. The liquid had the following characteristics: Solid content was 98%, Viscosity was 15-20 mPas, Hydride content was 11.68 cc $H_2/g$ (0.0521 wt %), the Molecular weight Mn was 4648, and the polydispersity index (PDI) was 1.6.

Comparative Example 1

Synthesis of Eugenol Terminated Siloxane Fluid $^{Eu}MD_{45}M^{Eu}$

A 250 ml RB flask was charged with $^{H}MD_{45}M^{H}$ (75 g, as prepared above) and alumina supported platinum catalyst (0.350 g). The mixture was stirred under nitrogen and brought to 80° C. Allyl-3-methoxy-4-hydroxybenzene (Eugenol) (9.622 g) was charged into an addition funnel and added drop wise at a rate to maintain a reaction temperature less than about 100° C. Following the addition, the reaction mixture was brought to about 80° C. for 1 hour and then the temperature was increased to about 100° C. for about 2 hours. Completion of the hydrosilylation reaction was confirmed by proton NMR. The reaction mixture was allowed to cool to less than 30° C., treated with Celite (0.5 g) and filtered. The resulting fluid was then stripped at 200° C./5 mbar to yield clear pale yellow liquid. The liquid had the following characteristics: Solid content was 98%, Viscosity was 130-150 mPas, the Molecular weight Mn was 4653, and the PDI was 4.2.

Example 2

Synthesis of Eugenol Hydride Fluid $^{Eu}MD_{45}D^{H}_{4}M^{Eu}$

A 250 ml RB flask was charged with (150 g)$^{Eu}MD_{45}D^{H}_{4}M^{Eu}$ (as prepared above) and (10.99 g) of tetramethylcyclotetrasiloxane (D4H). 0.20 g of trifluromehtanesufonic acid was added to the above mixture and stirred at 50° C. for 1 hr under Nitrogen. After 1 hour, the temperature was raised to 60° C. and maintained for 1 hour. The temperature was increased to 70° C. and maintained for 8 hour with stirring. After completion of the reaction, the flask was cooled to less than 30° C., neutralized with an acid catalyst using solid carbonate, treated with Celite and filtered. The resulting fluid was then stripped at 200° C./5 mbar to yield clear pale yellow liquid having molecular structure $^{Eu}MD_{45}D^{H}_{4}M^{Eu}$. The liquid had the following characteristics: Solid content was 98.2%, Molecular weight Mn was 5327, and the PDI was 1.9.

Example 3

Synthesis of Dibenzoyl Resorcinol Modified Siloxane Fluid $^{Eu}MD_{45}D^{DBR}_{4}M^{Eu}$ 30 g of Eugenol hydride fluid ($^{Eu}MD_{45}D^{H}_{4}M^{Eu}$) synthesized above was added to a RB flask. A karstedt catalyst was added and stirred at 50° C. under nitrogen. Allyl-dibenzoyl resorcinol (Allyl DBR) in toluene (20% solution) (10.8 g) was charged into an addition funnel and added drop wise at a rate to maintain a reaction temperature at less than 60° C. Following the addition, the reaction mixture was kept for another 3 hour at 60° C. Completion of the hydrosilylation reaction was confirmed by proton NMR. The reaction mixture was allowed to cool to less than 30° C., treated with celite (0.5 g) and filtered. The resulting fluid was then stripped at 200° C./5 mbar to yield clear pale yellow highly viscous liquid. The final product has the average structure of $^{Eu}MD_{45}D^{DBR}_{4}M^{Eu}$. The liquid had the following characteristics: Solid content was 98.5%, Molecular weight Mn was 6160, and the PDI was 5.3.

Example 4

Synthesis of Hydroxybenzophenone Modified Siloxane Fluid $^{Eu}MD_{45}D^{HBP}_{4}M^{Eu}$ Experiments were conducted under same reaction conditions using allyloxy-2-hydroxybenzophenone in the place of allyl-dibenzoyl resorcinol as described above. The liquid had the following characteristics: Solid content was 98%.

Synthesis of Polycarbonate-Polysiloxane Copolymers:

10.278 g of bisphenol-A, 1.142 g of phenol terminated UV absorber modified siloxane fluid and 0.113 g of benzene triethylammonium chloride (BTAC) were added to the four necked RB flask containing 50 mL of water and DCM. 7.42 g of triphosgene was weighed in a glass vial under a nitrogen atmosphere and dissolved in 25 mL DCM. The DCM contained the triphosgene was and transferred to the addition funnel. 25 mL of 25-30 weight percent NaOH solution was transferred to second additional funnel fixed in the reactor. Both triphosgene and NaOH were added to the reaction mixture simultaneously with vigorous stirring (300-400 rpm). NaOH addition was carefully done in such a way that pH of the reaction mixture was maintained between 5 and 6. The stirring was continued for another 20 min. The remaining amount of NaOH was added to increase pH to 10-11. The reaction mixture was stirred for another 5 to 10 minutes. 0.16 g of 4-cumyl phenol (pCP) and 54.4 mg of triethyl amine (TEA) were added. Stirring was continued for another 5 to 10 minutes and the pH was increased to 12 by adding aqueous NaOH. The reaction was stopped and organic layer was separated from aqueous layer using separating funnel. The polymer (organic layer) was washed with 1N HCl and precipitated in large excess of methanol. The final product was dried in an oven at about 60 to about 70° C. overnight.

TABLE 1

Compositional details of Polycarbonate-Polysiloxane copolymers

| Samples | $M_n$sec | $M_w$sec | PDI |
|---|---|---|---|
| Polycarbonate-Polysiloxane (Example-3) copolymer | 13904 | 65829 | 4.7 |
| Polycarbonate-Polysiloxane (Example-4) copolymer | 12712 | 26099 | 2.0 |
| Polycarbonate-Polysiloxane (Comparative example 1) copolymer | 42974 | 64852 | 1.5 |

As shown in Table 1 above, the polysiloxane-polycarbonate copolymers prepared by using reactive UV absorbing polysiloxane of Examples 3 and 4 showed generally comparable number average molecular weight (Mn), weight average molecular weight (Mw) and polydispersity index as compared with those of the polysiloxane-polycarbonate copolymers prepared according to the Comparative Example 1 (Eugenol terminated polysiloxane-polycarbonate copolymer). This clearly indicates the polymerizability of reactive UV absorbing polysiloxanes with bisphenol-A in presence of phosgene is quite similar to standard eugenol terminal polysiloxane. In addition, the cost effective reactive UV absorbing polysiloxanes based copolymers would have improved UV resistance properties.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:
1. A polysiloxane comprising a structure of Formula I:

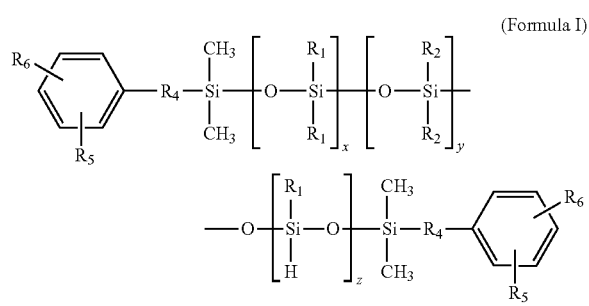

(Formula I)

wherein; $R_1$ and $R_2$ are independently a hydrocarbon radical, an unsaturated radical, an alkoxy radical, an aryl radical or an alkenyloxy radical; $R_3$ is an organic UV absorbing group derived from an allyl substituted 2-hydroxybenzophenone, allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone or allyl substituted dibenzoylresorcinol; $R_4$ is independently a hydrocarbon radical optionally substituted with oxygen and nitrogen, or a group of Formula II(a) or Formula II(b)

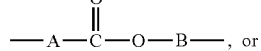

(Formula II(a))

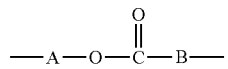

(Formula II(b))

wherein A and B are a hydrocarbon radical; $R_5$ is independently a hydrogen, a halogen, an aliphatic group having from 1 to 6 carbon atoms, an alkoxy group having from 1 to 6 carbon atoms, or an aryloxy group; $R_6$ is a hydroxyl group; x is from 1 to 300; y is from 0 to 50 and z is from 1 to 50.

2. A method of preparing the polysiloxane of claim 1 comprising:
reacting a hydride terminated siloxane represented by Formula III;

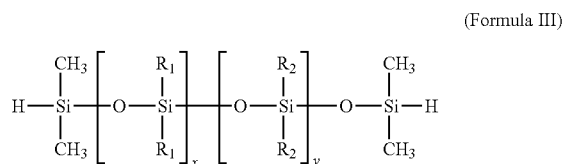

(Formula III)

wherein $R_1$ and $R_2$ are independently a hydrocarbon radical, an unsaturated radical, an alkoxy radical, an aryl radical or an alkenyloxy radical; wherein x is from 1 to 300 and y is from 0 to 50; with an allyl unsaturated chain containing substituted or unsubstituted hydroxyphenyl compound followed by equilibration of hydroxyphenyl compound terminated siloxane in presence of hydride substituted cyclic siloxane to obtain a hydroxyphenyl compound terminated siloxane having the formula:

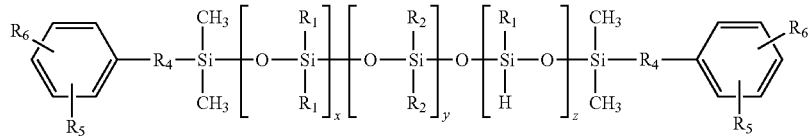

wherein $R_1$ and $R_2$ are independently a hydrocarbon radical, an unsaturated radical, an alkoxy radical, an aryl radical or an alkenyloxy radical; $R_4$ is independently a hydrocarbon radical optionally substituted with oxygen and nitrogen, or a group of Formula II(a) or Formula II(b)

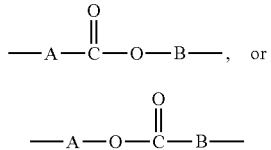

(Formula II(a))

(Formula II(b))

wherein A and B are a hydrocarbon radical; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; $R_6$ is independently a hydroxyl group; wherein x is from 1 to 300; y is from 0 to 50; and z is from 0 to 50;

reacting the hydroxyphenyl compound terminated siloxane with an allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone or allyl substituted dibenzoylresorcinol in the presence of a catalyst at a temperature of about 50 to 80° C., to yield the UV absorbing polysiloxane; and purifying the UV absorbing polysiloxane.

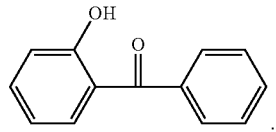

(Formula V)

6. A composition comprising the polysiloxane of claim 1 and a polymer selected from the group consisting of: polycarbonate homopolymers, polycarbonate copolymers, polycarbonate-polyesters, polyesters, polysulfones, polyethersulfones, polyetheretherketones, polyimides and polyetherimides.

7. An article comprising the polyosiloxane of claim 6.

8. A copolymer comprising at least one polysiloxane having units of Formula VI represented by:

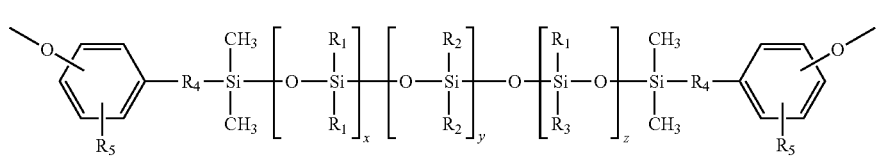

(Formula VI)

3. The polysiloxane of claim 1, wherein $R_3$ the organic UV absorbing group derived from an allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone.

4. The polysiloxane of claim 1, wherein $R_3$ is the organic UV absorbing group derived from an allyl substituted compound of Formula IV:

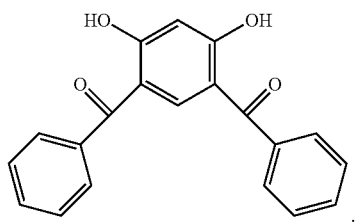

(Formula IV)

5. The polysiloxane of claim 1, wherein $R_3$ is the organic UV absorbing group derived from an allyl substituted compound of Formula V:

wherein; $R_1$ and $R_2$ are independently a hydrocarbon radical, an unsaturated radical, an alkoxy radical, an aryl radical or an alkenyloxy radical; $R_3$ is an organic UV absorbing group derived from an allyl substituted 2-hydroxybenzophenone, allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone, allyl substituted 2-(2'-hydroxy-5'-methylphenyl)-2H-benzotriazole, allyl substituted 2-(2'-hydroxy-5'-tert.-butylphenyl)-2H-benzotriazole, allyl substituted 2-(2'-hydroxy-3'-methyl-5'-tert.-butyl-phenyl)-2H-benzotriazole, allyl substituted 2-(2'-hydroxy-5'-cyclohexyl-phenyl)-2H-benzotriazole, allyl substituted 2'-(2'-hydroxy-3',5'-dimethyl-phenyl)-2H-benzotriazole, allyl substituted 2-(2'-hydroxy-5'-isooctylphenyl)-2H-benzotriazole, allyl substituted 2-(2'-hydroxy-3'-tert.-butyl-5'-sec.-butylphenyl)-2H-benzotriazole, allyl substituted 2-(2'-hydroxy-3',5'-dimethyl-phenyl)-2H-benzotriazole or allyl substituted dibenzoylresorcinol; $R_4$ is a hydrocarbon radical optionally substituted with oxygen and nitrogen, or a group of Formula II(a) or Formula II(b)

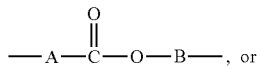

(Formula II(a))

(Formula II(b))

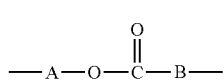

wherein A and B are a hydrocarbon radical; $R_5$ is independently a hydrogen, a halogen, an aliphatic group having from 1 to 6 carbon atoms, an alkoxy group having from 1 to 6 carbon atoms, or an aryloxy group; x is from 1 to 300; y is from 0 to 50 and z is from 1 to 50.

9. The copolymer of claim 8, further comprising structural units of Formula VII:

(Formula VII)

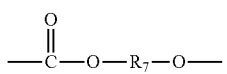

wherein each $R_7$ is a hydrocarbon radical having 1 to 60 carbon atoms, of Formula VIII;

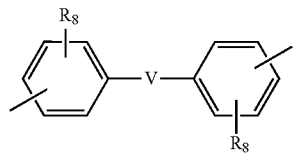

wherein $R^8$ is independently; a hydrogen, a halogen, an aliphatic group having from 1 to 6 carbon atoms, an aromatic group having 6 to 8 carbon atoms, an alkoxy group having from 1 to 6 carbon atoms, or an aryloxy group; and V is selected from the group consisting of:

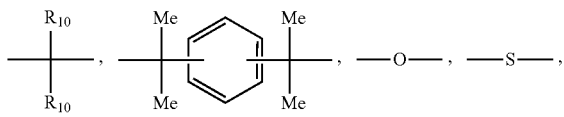

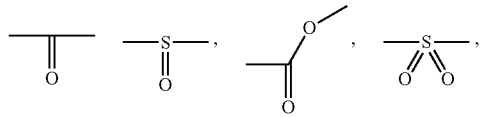

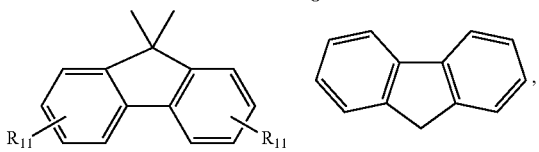

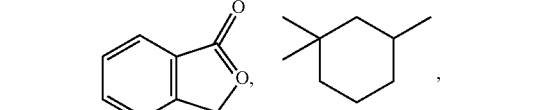

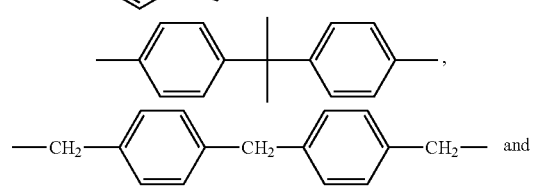

and

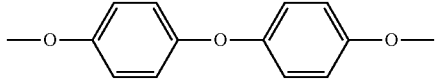

wherein $R_{10}$ and $R_{11}$ are independently; a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

10. The copolymer of claim 9, wherein $R_{10}$ is alkyl group of from 1 to 6 carbon atoms.

11. A composition comprising the copolymer of claim 8 and a polymer selected from the group consisting of a polycarbonate homopolymer, a polycarbonate copolymer, a polycarbonate-polyester, a polyester, a polysulfone, a polyethersulfone, a polyetheretherketone, a polyimide, a polyetherimide, or a combination thereof.

12. The copolymer of claim 8, wherein $R_3$ is the organic UV absorbing group is derived from an allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone.

13. The copolymer of claim 8, wherein $R_3$ is the organic UV absorbing group derived from an allyl substituted compound of Formula IV:

(Formula IV)

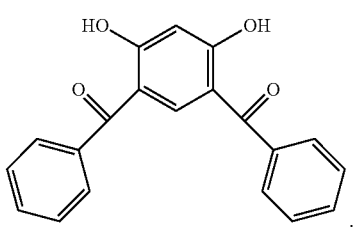

14. The copolymer of claim 8, wherein $R_3$ is the organic UV absorbing group derived from an allyl substituted compound of Formula V:

(Formula V)

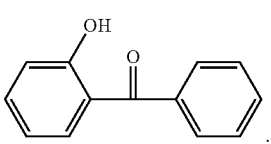

15. An article comprising the copolymer of claim 8.

16. The article of claim 15, wherein said article is selected from the group consisting of panels, films and casts.

17. A method of preparing a polysiloxane copolymer, comprising polymerizing an organosiloxane represented by Formula I:

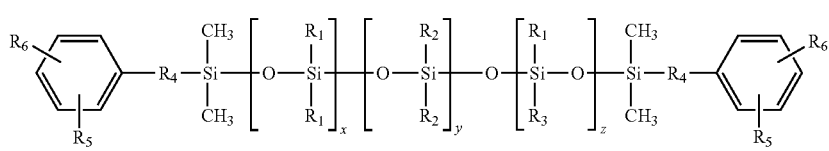
(Formula I)

wherein $R_1$ and $R_2$ are independently a hydrocarbon radical, an unsaturated radical, an alkoxy radical, an aryl radical or an alkenyloxy radical; $R_3$ is an organic UV absorbing group derived from an allyl substituted 2-hydroxy-4-methoxybenzophenone, allyl substituted 2-hydroxy-4-methoxy-2'-carboxybenzophenone, allyl substituted 2,4-dihydroxybenzophenone, allyl substituted 2,2'-dihydroxy-4-methoxybenzophenone, allyl substituted 2,2'-dihydroxybenzophenone, allyl substituted 2,2',4,4'-tetrahydroxybenzophenone, allyl substituted 2,2'-dihydroxy-4,4'-dimethoxybenzophenone, allyl substituted 2,2'-dihydroxy-4,4'-diethoxybenzophenone, allyl substituted 2,2'-dihydroxy-4,4'-dipropoxybenzophenone, allyl substituted 2,2'-dihydroxy-4,4'-dibutoxybenzophenone, allyl substituted 2,2'-dihydroxy-4-methoxy-4'-ethoxybenzophenone, allyl substituted 2,2'-dihydroxy-4-methoxy-4'-propoxybenzophenone, allyl substituted 2,2'-dihydroxy-4-methoxy-4'-butoxybenzophenone, allyl substituted 2-(2'-hydroxy-5'-methylphenyl)-2H-benzotriazole, allyl substituted 2-(2'-hydroxy-5'-tert.-butylphenyl)-2H-benzotriazole, allyl substituted 2-(2'-hydroxy-3'-methyl-5'-tert.-butyl-phenyl)-2H-benzotriazole, allyl substituted 2-(2'-hydroxy-5'-cyclohexyl-phenyl)-2H-benzotriazole, allyl substituted 2'-(2'-hydroxy-3',5'-dimethyl-phenyl)-2H-benzotriazole, allyl substituted 2-(2'-hydroxy-5'-isooctylphenyl)-2H-benzotriazole, allyl substituted 2-(2'-hydroxy-3'-tert.-butyl-5'-sec.-butylphenyl)-2H-benzotriazole, allyl substituted 2-(2'-hydroxy-3',5'-dimethyl-phenyl)-2H-benzotriazole or allyl substituted dibenzoylresorcinol; $R_4$ is hydrocarbon radical optionally substituted with oxygen and nitrogen, a group of Formula II(a) or Formula II(b)

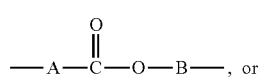
(Formula II(a))

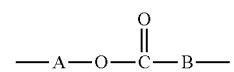
(Formula II(b))

wherein A and, B are a hydrocarbon radical; $R_5$ is independently a hydrogen, a halogen, an aliphatic group having from 1 to 6 carbon atoms, an alkoxy group having from 1 to 6 carbon atoms, or an aryloxy group; $R_6$ is a hydroxyl group; x is from 1 to 300; y is from 0 to 50 and z is from 1 to 50, with a compound represented by Formula VIII:

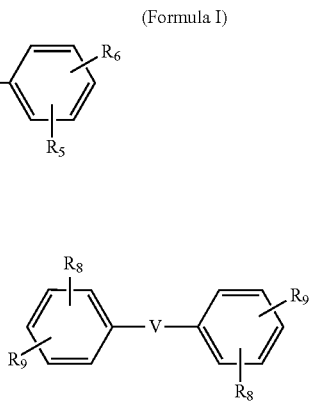

where $R^8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is a hydroxyl group; and V is selected from the group consisting of:

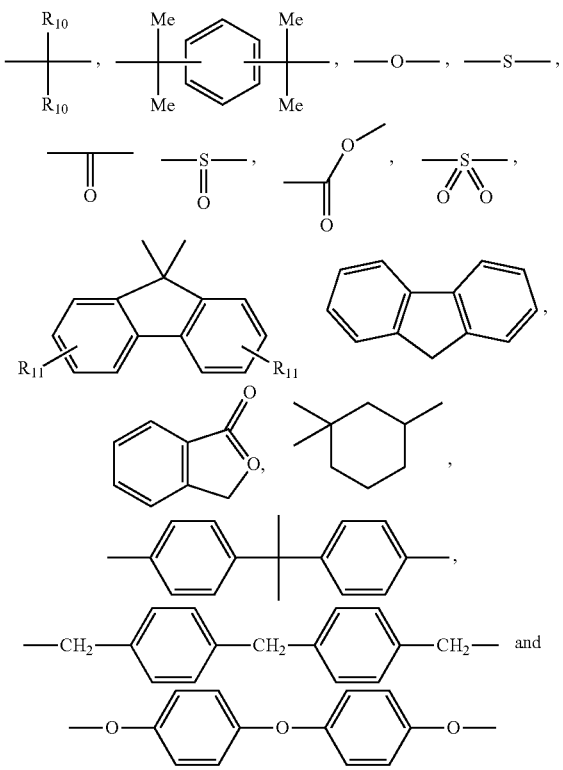

wherein $R_{10}$ and $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group; in the presence of a carbonate precursor.

18. The method of claim 17, wherein the carbonate precursor is selected from the group consisting of phosgene, diphosgene, diarylcarbonate, bis(methylsalicyl)carbonate, and a combination thereof.

19. The method of claim 17, wherein the polymerizing step is an interfacial polymerization process conducted in the presence of a solvent and optionally one or more catalysts.

20. The method of claim 17, wherein the one or more catalysts are selected from the group consisting of: aliphatic amines, trialkylamine; and phase transfer catalyst of the formula $(A_3)4L+B$, wherein each A is independently a C1-10 alkyl group; L is a nitrogen or phosphorus atom; and B is a halogen atom or a C1-8 alkoxy group or C6-18 aryloxy group.

* * * * *